(12) United States Patent
Milanovic

(10) Patent No.: US 9,772,024 B2
(45) Date of Patent: Sep. 26, 2017

(54) METHOD OF MAKING A PINION FOR BEING ASSEMBLED ON A TURBINE AXIS OF AN INTERNAL COMBUSTION ENGINE

(71) Applicant: FPT Motorenforschung AG, Arbon (CH)

(72) Inventor: Dragoljub Milanovic, St. Gallen (CH)

(73) Assignee: FPT MOTORENFORSCHUNG AG, Arbon (CH)

( * ) Notice: Subject to any disclaimer, the term of this patent is extended or adjusted under 35 U.S.C. 154(b) by 282 days.

(21) Appl. No.: 14/679,753

(22) Filed: Apr. 6, 2015

(65) Prior Publication Data

US 2015/0285359 A1    Oct. 8, 2015

(30) Foreign Application Priority Data

Apr. 8, 2014  (EP) .................................. 14163879

(51) Int. Cl.
| | |
|---|---|
| *F16H 55/17* | (2006.01) |
| *B23P 15/14* | (2006.01) |
| *F16H 57/00* | (2012.01) |
| *F02C 7/36* | (2006.01) |
| *F16D 1/06* | (2006.01) |
| *F16B 39/286* | (2006.01) |

(52) U.S. Cl.
CPC .............. *F16H 55/17* (2013.01); *B23P 15/14* (2013.01); *F02C 7/36* (2013.01); *F16H 57/0025* (2013.01); *F05D 2250/281* (2013.01); *F16B 39/286* (2013.01); *F16D 1/06* (2013.01); *Y10T 29/49467* (2015.01); *Y10T 74/1987* (2015.01)

(58) Field of Classification Search
CPC ........ F16H 55/17; F16H 57/0025; F02C 7/36; F16B 39/286; F16B 39/284; F16D 1/06; B23P 15/14; F05D 2250/281; Y10T 74/1987; Y10T 29/49467
See application file for complete search history.

(56) References Cited

U.S. PATENT DOCUMENTS

| | | | | |
|---|---|---|---|---|
| 1,087,056 | A | * | 2/1914 | Ward .................... F16B 39/286 411/291 |
| 2,421,254 | A | * | 5/1947 | Froelich ................ F04D 29/263 403/197 |
| 3,417,915 | A | * | 12/1968 | Granberg ............... F04C 18/36 418/191 |

FOREIGN PATENT DOCUMENTS

| | | |
|---|---|---|
| CN | 203214816 | 9/2013 |
| DE | 235716 | 10/1910 |
| WO | WO0242665 | 5/2002 |

* cited by examiner

*Primary Examiner* — Grant Moubry
(74) *Attorney, Agent, or Firm* — Stetina Brunda Garred and Brucker

(57) ABSTRACT

A pinion to be fitted on a turbine axis of an internal combustion engine, wherein said pinion is made in a single piece, equipped with an axial thread to screw it on said axis of the turbine, wherein an axial end of the pinion integrates/defines a disc spring.

13 Claims, 2 Drawing Sheets

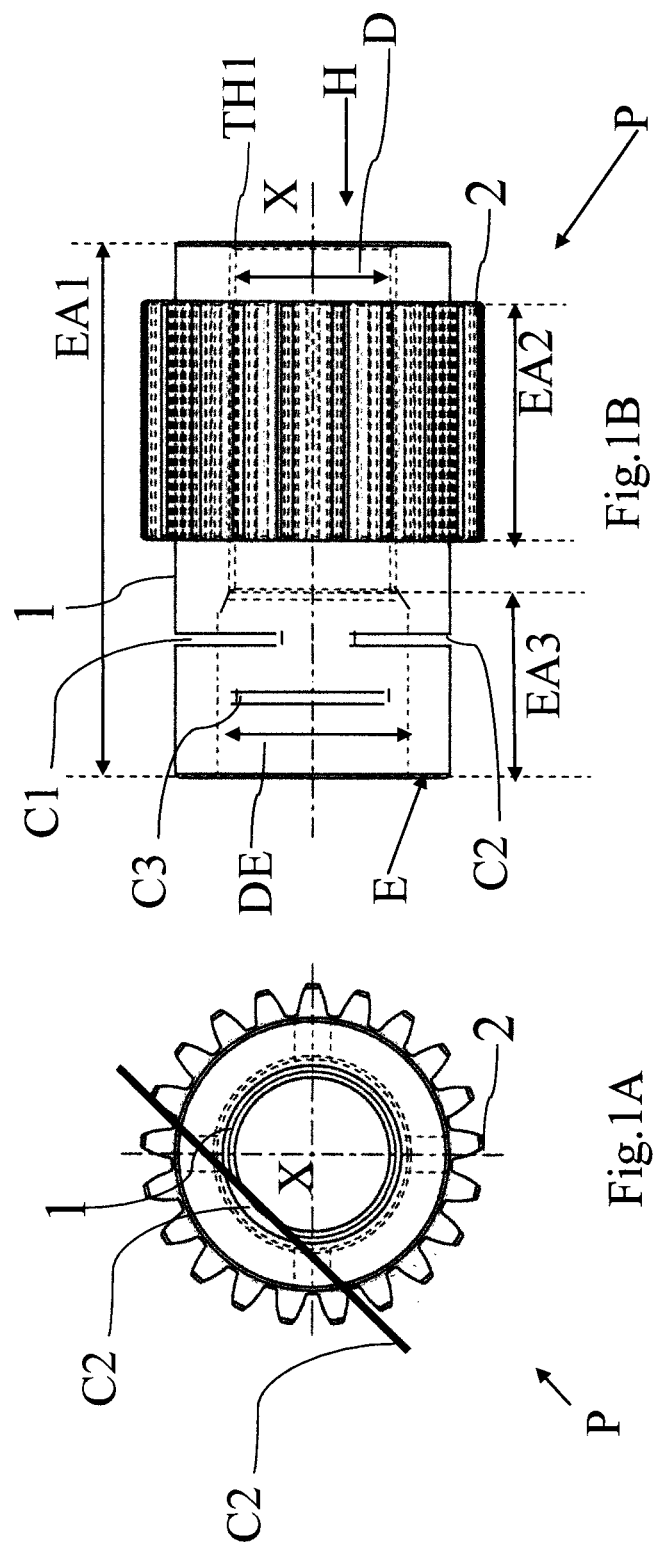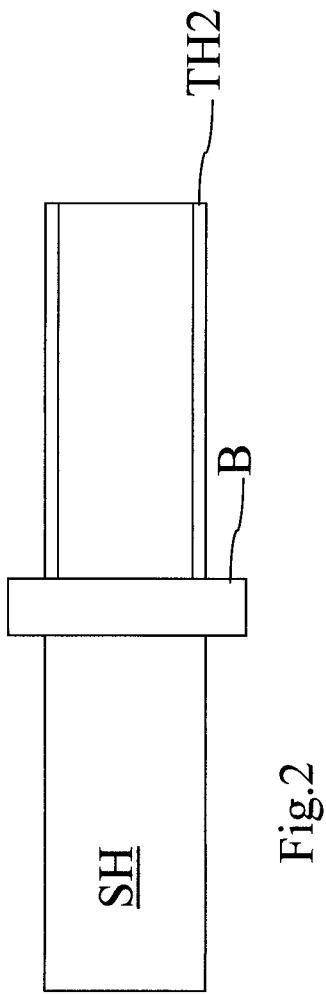

METHOD OF MAKING A PINION FOR BEING ASSEMBLED ON A TURBINE AXIS OF AN INTERNAL COMBUSTION ENGINE

CROSS REFERENCE TO RELATED APPLICATIONS

The present application claims priority to European Patent Application No. 14163879.1 filed Apr. 8, 2014, the entirety of the disclosures of which are expressly incorporated herein by reference.

STATEMENT RE: FEDERALLY SPONSORED RESEARCH/DEVELOPMENT

Not Applicable.

APPLICATION FIELD OF THE INVENTION

The present invention refers to the field of the method for assembling the components relating to the transmission of the motion of turbines of internal combustion engines and in particular to the assembling of a pinion on the respective axis of a turbine.

DESCRIPTION OF THE PRIOR ART

In general, turbines provided with pinions on their axis are intended to be connected to the drive shaft of the internal combustion engine, to obtain schemes and respective alternative embodiments of turbocompound systems.

The axis of the turbines in the automotive field are relatively thin, with a diameter comprised between 8 and 20 mm. The pinion is splined on this axis. Grooved couplings of axial type cannot be used on such a thin axis, since they would weaken too much the axis itself.

According to a possibile not known solution, the pinion can be screwed on the turbine axis, but it is necessary to consider that if the turbine is in turbocompound configuration, then there is a step wherein the turbine generates mechanical torque and transfers it to the drive shaft, and a step wherein the drive shaft drives the turbine. In either of the two steps, according to the direction of the screw thread, the pinion can screw out of the shaft.

The use of radial pins or dowels is unfeasible, since it would induce an eccentricity of the masses that, at the speed of rotation reached by the turbine, would determine a fast wear of the bearings supporting the shaft itself.

Because of this problems, the most widespread assembling method is of the type "press to fit", which means that the pinion engages by force the turbine axis, obtaining a single piece that cannot be disassembled, namely that needs to be broken in order to separate its parts or that needs the pinion to be heated.

Such solution is not optimal.

SUMMARY OF THE INVENTION

Therefore the aim of the present invention is to provide a universal method for assembling a pinion on a respective turbine axis.

The idea at the basis of the present invention is to make a disc spring in the body itself of the pinion.

The pinion according to the present invention, made of a single piece, comprises two portions with axial symmetry, one annular to the other, wherein the external portion is toothed and the internal portion has a coaxial hole, only partially threaded, so that the pinion can be screwed on a corresponding thread made on the turbine axis.

The internal portion has a larger extension than the external portion so that, at least one of the ends, according to the axis of symmetry of the pinion, emerges with respect to the toothed portion. Such emerging part of the internal portion, for a predefined limited extension, has the central hole with a larger diameters with respect to the remaining threaded part and at least one partial cut according to a parallel of the end part itself, in correspondence of such limited extension.

Preferably, different cuts are made either consecutive but discontinuous on the same parallel or on reciprocally parallel parallels, with an appropriate angular offset.

Such end, thus, appears to be weakened if subject to an axial compression, having the same behavior as a disc spring.

The properties of such pinion can be exploited by making a turbine axis, having a fixed abutment ring nut and an adjacent thread complementary with the thread of the aforementioned coaxial hole.

By screwing the pinion on the turbine axis, when the aforementioned at least one end of the pinion comes into contact with the fixed abutment ring nut, such end starts to be compressed and deformed storing compression energy.

Such compression energy avoids the pinion to be unscrewed due to the torques applied to the pinion itself during the normal functioning of the respective turbine.

According to a further alternative embodiment of the invention, partial cuts are made according to parallels of the internal portion, also in correspondence of the coaxial portion of hole that will be threaded, then the pinion is axially compressed or pulled and after that the internal thread is made in the coaxial hole.

Thus, small localized variations of the pitch of the thread are obtained, which advantageously increase the tightening friction of the pinion on the axis of the turbine.

A first object of the present invention is a method of making a pinion for being assembled on a turbine axis of an internal combustion engine is object of the present invention, in accordance with claim 1.

Another object of the present invention is a pinion corresponding to the aforementioned method is also object of the present invention.

In addition, a further object of the present invention is a turbine comprising the aforementioned pinion and an internal combustion engine comprising said turbine.

The claims are an integral part of the present description describing preferred embodiment thereof.

BRIEF DESCRIPTION OF THE FIGURES

Further purposes and advantages of the present invention will become clear from the following detailed description of a preferred embodiment (and of its alternative embodiments) and the drawings that are attached hereto, which are merely illustrative and non-limitative, in which:

FIGS. 1A and 1B show an axial and a side view respectively of a pinion according to the present invention, FIG. 2 shows a side view of a respective turbine axis on which the aforementioned pinion is intended to be assembled;

In the figures the same reference numbers and letters identify the same elements or components.

DETAILED DESCRIPTION OF PREFERRED EMBODIMENTS OF THE INVENTION

Figure 3:
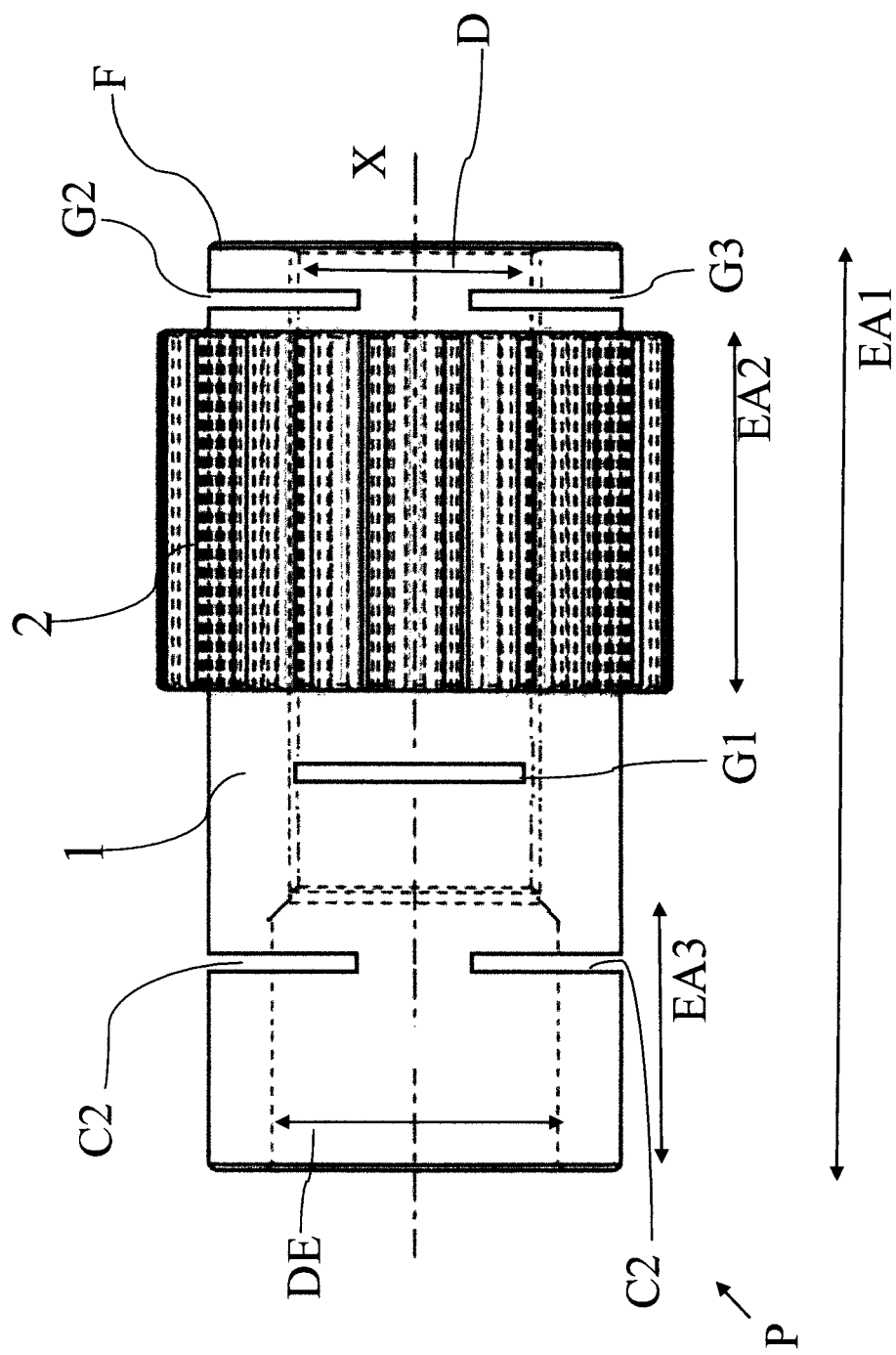
FIG. 3 shows a preferred alternative embodiment of the pinion shown in FIG. 1B.

With reference to FIG. 1A which shows an axial view of the pinion P that is object of the present invention and to FIG. 1B which shows a side view of the same pinion it is possible to see immediately that the pinion defines an axial symmetry according to the axis X; furthermore, although made in a single piece, it comprises:

a first internal part 1 having a coaxial hole, generally a through hole, H having a threaded portion TH1 with internal diameter D and a second external part 2, toothed and annular with respect to the first part, wherein the first part 1 has a larger axial extension EA1 than the axial extension EA2 of the second part.

For a greater convenience, the first part is defined as axial and the second part as annular, although they are made in a single piece.

At least one end E and/or F of the axial part emerges axially with respect to the annular part.

Such emerging portion, with particular reference to the end E of the figures, for a predefined limited extension EA3, has the central hole with a larger diameter than the diameter D of the remaining threaded part of the axial hole H and at least one partial cut C1, C2, C3 according to a parallel of the end E itself, in correspondence of such limited extension EA3.

In a cylindrical shape, the concept of "parallel" is clear, being it circumferential to the cylinder according to an intersection with a plane perpendicular to the symmetry axis of the cylinder itself.

In FIG. 1A, the partial cut C2 is indicated by means of a thick line.

It is worth noting that the term partial cut has to be intended as a cut that does not affect the whole circumference of the first part 1, but a portion preferably smaller than 180°.

From FIG. 1A it can be understood that the partial cuts C1, C2, C3 reach, from the outside, the through hole H.

Preferably, different cuts are made, either consecutive C1, C2 but discontinuous on the same parallel, or on reciprocally parallel parallels (C1, C2), C3, with an appropriate angular offset.

Such end E, thus, is weakened and, if subject to an axial compression, it behaves like a disc spring.

With reference to FIG. 2, the axis of the turbine SH has a threaded portion TH2 and a fixed ring nut B, that defines a stop point for the weakened end E of the pinion P.

Thus, according to the present invention, a pinion is made in a single body comprising an end E of the axial portion 1 axially projecting with respect to the annular portion 2 and it is equipped with a coaxial hole H having a threaded portion with a smaller diameter D than a non-threaded portion EA3 with a larger diameter DE. This non-threaded portion is made in correspondence of the projecting end E. Furthermore, this non-threaded portion is equipped with weakening cuts C1, C2, C3. In other words, the end E is machined in order to define a disc spring.

As regards the machining operations, the order in which they are carried out to make the pinion is not relevant.

For example, the toothing of the annular part 2 can be made after having made the end E that defines a disc spring.

For example, the axial hole H can be made either before or after the different cuts C1, C2, C3, the same is valid also for the respective threaded part or for the widening of the diameter of the hole in the extension EA3.

Advantageously, the end E has a larger elasticity, thus it is possible to exert a tightening torque that effectively opposes the undesired unscrewing of the pinion.

If it is necessary to replace the pinion, by applying an appropriate torque it is always possible to unscrew it without breaking or heating it.

With reference to FIG. 3, wherein a preferred alternative embodiment of the invention is shown, one or more further partial cuts G1, G2, G3, according to one or more parallels of the axial portion 1 are made on the end E and/or F in correspondence of the axial hole H intended to be provided with thread TH1.

In this case, it is preferable to first make said one or more further partial cuts G1, G2, G3, and then subject the pinion to an axial compression or traction and after that the internal thread TH1 is made.

Thus, if the axial hole H is already present, the cuts G1, G2, G3 are made where the axial hole H is intended to be screwed, namely to have diameter D. FIG. 3 shows that two consecutive cuts G1 and G2 were made on the end F, opposite to the aforementioned end E.

Also the partial cuts G1, G2, G3 are made so that the coaxial H can be reached from the outside.

Thus the cut G1 increases the axial elasticity of the pinion, so that the fact of making the thread while the pinion is subject to compression or to traction, determines a thread that locally has a respectively larger or smaller pitch.

This determines an increase of the tightening torque of the pinion on the axis SH which is advantageous to avoid the undesired unscrewing of the pinion from the axis.

While it can make sense to make the disc spring only on one of the ends (E), the other partial cuts G1-G3 can be made on any one of the ends E, F or on both. This is because the local deformation of the thread carries out its function in any point of the thread TH1.

It will be apparent to the person skilled in the art that other alternative and equivalent embodiments of the invention can be conceived and reduced to practice without departing from the scope of the invention.

From the description set forth above it will be possible for the person skilled in the art to embody the invention with no need of describing further construction details. The elements and the characteristics described in the different preferred embodiments may be combined without departing from the scope of the present application. What is described in the description of the prior art, if not explicitly excluded in the detailed description, has to be considered in combination with the characteristics of the present invention, forming an integral part of the present invention. In addition, the features disclosed in the description of the prior art are introduced only in order to better understand the invention and not as a declaration about the existence of known prior art.

The invention claimed is:

1. A method of forming a pinion as a single piece, for coupling to a turbine shaft said method comprising:

extending a through-hole longitudinally through a center portion of the pinion;

forming an axial thread on an inner surface of the through-hole; and forming a disc spring in a first end of said pinion to facilitate opposing unscrewing of the pinion from the turbine shaft.

2. The method according to claim 1, comprising at least the following steps:
- making of an axial part having a coaxial hole (H)
- making of a toothed part, annular with respect to the axial part, wherein the axial part has an axial extension larger than the axial extension of the second part, defining said axial end of said pinion, axially projecting with respect to the toothed part and defining said disc spring,
- making of a thread in said coaxial hole,
- widening of a portion of said coaxial hole for a limited and predefined extension of the projecting end obtaining a larger diameter than the diameter of the remaining threaded part,
- making of at least one partial cut parallel to the axial end, the at least one partial cut located in the limited extension.

3. The method according to claim 2, wherein when the partial cuts are more than one, and the partial cuts can be consecutive but discontinuous on a same parallel or on different parallels.

4. The method according to claim 3, wherein when the partial cuts are arranged on different parallels, and the partial cuts are angularly offset.

5. The method according to claim 2, further comprising the following steps in a succession:
- making of at least one further partial cut parallel to the at least one partial cut on said at least one projecting end and within a diameter of coaxial hole configured to be threaded,
- application of an axial traction or compression force to the pinion (P),
- making of said thread,
- removing of said axial traction or compression force from the pinion.

6. The method according to claim 1, comprising a step of making a turbine axis having a thread complementary with the thread of the pinion and a fixed abutment ring nut with which said disc spring is configured to come into contact.

7. A unitary pinion configured for coupling to a turbine shaft, said pinion comprising:
- a through-hole extending longitudinally through a center portion of the pinion;
- an axial thread defined on an inner surface of the through-hole, said axial thread configured to matingly engage a threaded portion of the turbine shaft;
- a disc spring defined in a first end of said pinion to facilitate opposing unscrewing of the pinion from the turbine shaft.

8. The pinion according to claim 7, wherein said pinion comprises:
- an axial part having an axial through hole provided with a thread and a non-threaded portion for a limited axial extension,
- a second toothed part, located annularly outside of the axial part, wherein the axial part has an axial extension larger than the axial extension of the toothed part, defining said axial end, and integrating said disc spring,
- wherein said non-threaded portion has a larger diameter than the diameter of the remaining threaded part of the through hole and has at least one partial cut parallel to the axial end itself, in correspondence of such limited extension.

9. The pinion according to claim 8, wherein when the partial cuts are more than one, and the partial cuts can be consecutive but discontinuous on a same parallel or on different parallels.

10. The pinion according to claim 9, wherein when the partial cuts are arranged on different parallels, the partial cuts are angularly offset.

11. The pinion according to claim 8, wherein said pinion further comprises at least a further partial cut parallel to the axial end; and wherein the thread has, between said further partial cut and the axial end, a pitch increase or reduction.

12. The pinion according to claim 7, comprising a turbine section having a thread complementary with the thread of the pinion and a fixed abutment ring nut with which said disc spring is configured to come into contact.

13. A turbine comprising an axis and a respective pinion and a respective assembling system according to claim 7.

* * * * *